Aug. 25, 1959 C. L. GOLDTRAP 2,900,996
TOILET TANK SUPPLY VALVE ASSEMBLY
Filed June 28, 1957 2 Sheets-Sheet 1

INVENTOR.
Charley L. Goldtrap,
BY
Beau, Brooks, Buckley & Beau
ATTORNEYS.

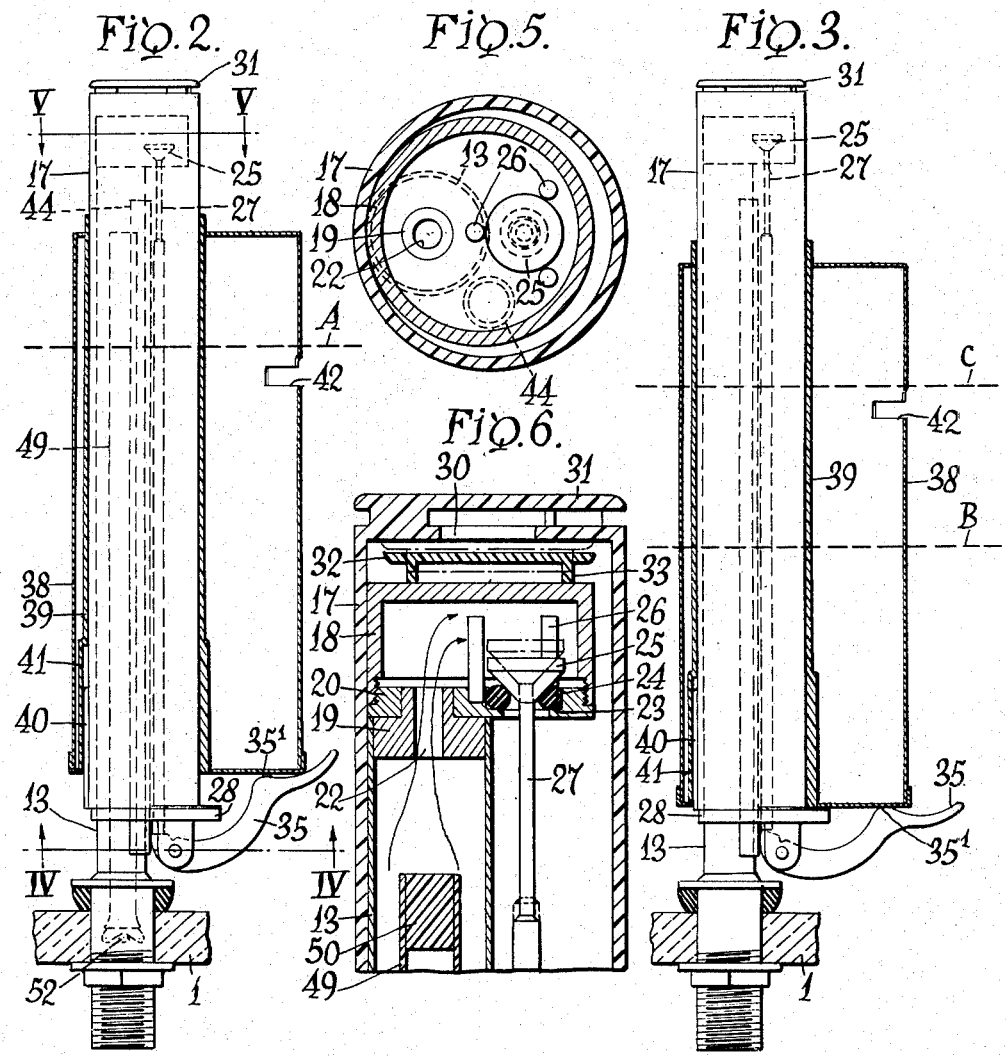

United States Patent Office 2,900,996
Patented Aug. 25, 1959

2,900,996

TOILET TANK SUPPLY VALVE ASSEMBLY

Charley L. Goldtrap, Denver, Colo., assignor of one-third to Dan Kamphausen, Littleton, and one-third to William W. Flenniken, Englewood, Colo.

Application June 28, 1957, Serial No. 668,788

9 Claims. (Cl. 137—416)

This invention relates to a new and useful toilet tank supply valve assembly.

It is an object of my invention to provide a toilet tank supply valve assembly which is smooth, positive and quiet in operation.

Another object of my invention is to provide a toilet tank supply valve assembly having a minimum of moving parts, and which utilizes the inlet water pressure to close its control valve and to hold it in closed position.

Still another object of my invention is to provide a toilet tank supply valve assembly having an outlet and a valve therefor normally held closed by inlet water pressure, said valve being out of contact with the water in the tank when the latter is filled and vented to the atmosphere so as to preclude siphoning of such water back past the valve and into the supply line.

It is also an object of my invention to provide a toilet tank supply valve assembly which will operate satisfactorily under conditions of very low water pressure, and which will fill the toilet bowl to seal the same whenever there is sufficient supply pressure to deliver water into the tank.

In addition, it is an object of my invention to provide the foregoing in an assembly which is characterized by extreme simplicity, lack of necessity for adjustment, and which is extremely durable, dependable and long lasting while being relatively inexpensive to fabricate and assemble.

A toilet tank supply valve assembly constructed in accord with my invention is characterized in one aspect thereof by the provision of a housing, an inlet conduit adapted for connection to a source of water under pressure and having an outlet positioned within the housing substantially above the normal level of water in the tank, a control valve for the outlet, a float member guided by the housing for rising and falling relative thereto and controlling opening and closing of the control valve, a tank filling conduit extending from the interior of the housing into communication with the tank exteriorly of the housing, the entrance to the tank filling conduit being positioned between the outlet and the normal water level in the tank, whereby water passing through the outlet into the housing first fills the latter to the level of the tank filling conduit entrance and then fills the tank therethrough, and bowl filling conduit means opening into the housing and having an entrance positioned substantially below the normal level of water in the tank, whereby if there is sufficient water entering the housing to reach the entrance to the tank filling conduit there is water available to fill an associated toilet bowl to seal the same.

Other objects, advantages and characterizing features of a toilet tank supply valve assembly constructed in accord with my invention will become clearly apparent from the ensuing detailed description of a presently preferred embodiment thereof, in conjunction with the accompanying drawings illustrating such embodiment and forming a part hereof, wherein:

Fig. 2 is a view, partly in section, showing my supply valve assembly in closed position;

Fig. 3 is a similar view, but showing my supply valve assembly moved to open position in response to flushing of the tank;

Fig. 4 is a sectional view taken about on line IV—IV of Fig. 2;

Fig. 5 is a sectional view taken about on line V—V of Fig. 2;

Fig. 6 is an enlarged, fragmentary sectional view showing the control valve.

Figure 1:
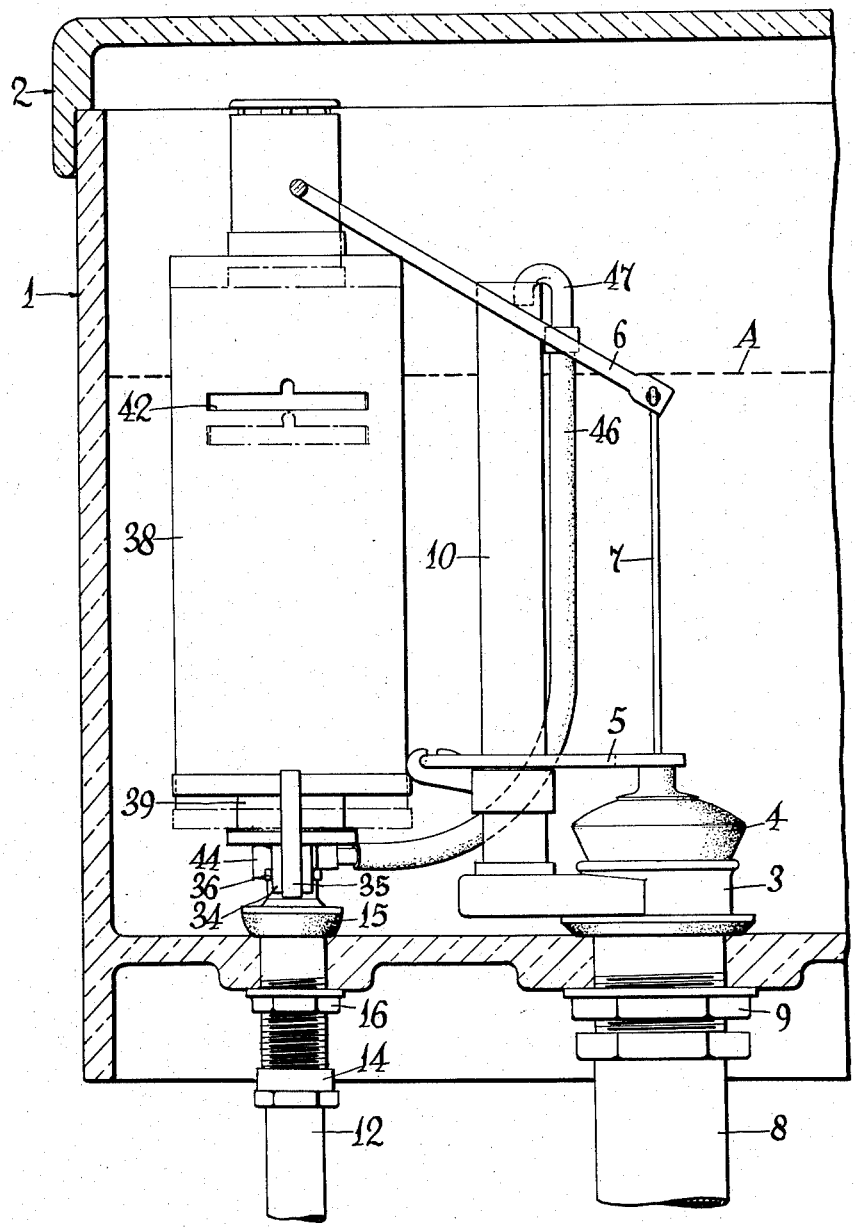
Fig. 1 is a fragmentary, sectional view of a toilet tank showing my new supply valve assembly operatively installed therein.
Figure 7:
Fig. 7 is a side elevational view of a surge dampener used in the supply line.

Referring now to the embodiment illustrated in the accompanying drawing, the supply valve assembly of my invention is adapted for use for example in a toilet tank 1 having a top cover 2 and equipped with a flush valve assembly comprising a valve seat 3 for a stopper ball 4, the ball 4 having a hinged guide 5 and being arranged to be lifted from seat 3 by turning a handle, not illustrated, to actuate a flush lever 6 connected to ball 4 by a link 7. Seat 3 is coupled to an outlet conduit 8 leading to a toilet bowl, not illustrated, being locked in position as by a nut 9. An overflow pipe 10 communicates with outlet conduit 8 through flush valve seat 3, all in a known manner, the foregoing parts being conventional and per se comprising no part of my invention.

The supply valve assembly of my invention is adapted to communicate with the usual tank supply line 12, having an inlet conduit 13 passing through the bottom wall of tank 1 and connected to supply line 12 by an appropriate coupling 14, together with sealing means 15 to provide a water tight seal against the bottom of the tank 1, inlet conduit 13 being locked thereagainst as by a lock nut 16. Inlet conduit 13 extends upwardly within tank 1 nearly to the top of a relatively fixed first housing 17, herein of cylindrical form. Housing 17 is normally upright and has a bottom wall 28 bonded or otherwise fixed to conduit 13 for being supported thereon. At its upper end, conduit 13 communicates with a generally cylindrical cap member 18, being provided with a fitting 19 connected to a wall like plug member 20 screwthreaded into the bottom of cap 18, fitting 19 having a passage 22 therethrough communicating with the interior of cap 18.

Plug 20 is formed to provide a control valve seat 23, defining an outlet opening, encircled by sealing means such as a gasket 24 of generally circular cross-section, and a control valve 25 of tapered, generally funnel shape is guided by for example three upright posts 26 for movement from a closed position, illustrated in full lines in Fig. 6, upwardly to an open position illustrated by broken lines therein. A valve stem 27 depends from valve 25 through seat 23, extending all the way down through housing 17 and through the enlarged bottom wall 28 thereof.

At its upper end, housing 17 is formed with a vent opening 30, having a cover part 31 spaced therefrom, to vent the interior of housing 17 to the atmosphere for a purpose to be described. A floatable valve 32, adapted to close vent opening 30 and having a depending annular skirt 33, normally rests loosely on top of cap 18 within housing 17.

A lever 35 is pivoted to a bracket 34 depending from the housing bottom wall 28, as by a pivot pin 36, and has a relatively short arm which normally abuts valve stem 27.

The relatively long arm of lever 35 normally abuts a relatively movable second housing 38, herein also in the form of a cylinder, which also is hollow and which has a cylindrical sleeve 39 extending therethrough in concentric relation to housing 17. Sleeve 39 slip-fits over housing 17, so that movable housing 38 is adapted to rise and fall in tank 1, moving along housing 17 which is provided with guide means in the form of a key 40 fitting in a guide track 41 formed in the wall of sleeve 39 to hold the outer, movable housing 38 in fixed position circumferentially of the inner, fixed housing 17.

Housing 38 has a slot 42 in the side wall thereof, between the opposite ends thereof, and functions as a float member for opening control valve 25 in response to flushing of tank 1.

A tank filling conduit in the form of a riser tube 44 extends through bottom wall 28 of housing 17 to a point substantially below the control valve outlet opening, as for example approximately 1 inch, and an opening 45 is provided in bottom wall 28, leading to a bowl filling conduit 46 communicating with the overflow pipe 10. Conduit 46 terminates in a hook-like member 47 engaging the upper edge of pipe 10, which is substantially below the upper end of riser 44, as for example about one inch.

To prevent hammering upon sudden closing of control valve 25, a surge dampener 49 comprising an elongated tube of flexible material plugged at spaced points therealong, as by plugs 50, to define a number of flexible wall chambers, is inserted in inlet conduit 13. Dampener 49 is held in place in conduit 13 by any suitable means such as for example a bifurcated end plug 51 adapted to rest on a cross pin 52 (Fig. 2).

Description of operation

Assume now that tank 1 is filled, with all parts in their position of rest for that condition. The level of water in tank 1, when properly filled, is denoted by the line A which it will be noted is spaced substantially below the upper end of overflow pipe 10, as for example approximately one inch, and is about one quarter inch above the top edge of slot 42 in float member 38. Float 38 is in its raised position as shown in Fig. 2, and in full lines in Fig. 1, being made buoyant by the air trapped in the upper part thereof, above the upper edge of slot 42, by the water in tank 1. Control valve 25 is in closed position, and is held in closed position by the supply pressure on water in inlet conduit 13 and cap 18. It will be noted that the water within float member 38 is about at level A, as is the water within housing 17, and it will be further noted (Fig. 2) that this level A is well below the upper end of the tank filling riser tube 44.

When the toilet is flushed in the usual manner, the water in tank 1 drops from level A, and opens slot 42 for communication with the atmosphere. Water remains within the lower part of float member 38, to the level of the bottom edge of slot 42 as the water level in tank 1 continues to drop.

Float member 38 does not immediately follow the receding water in tank 1 but is initially supported in its raised position by the water supply pressure in inlet conduit 13, acting against control valve 25 and through stem 27 and lever 35 which comprise an actuating, connecting linkage between control valve 25 and float member 38. This is clearly illustrated in Fig. 2, which shows float member 38 supported by the curved outer arm of lever 35, which arm is provided with a lobe 35' thereon for supporting the float member when it does descend.

Float member 38 remains supported in its raised position until the water in tank 1 reaches a level sufficiently far below that of the water in float member 38, when in its raised position, to create a head of water exerting sufficient pressure to overcome the supply water pressure holding control valve 25 closed. In the illustrated embodiment, this occurs when the water in tank A reaches level B (Fig. 3) which is about ⅓ of the way down float member 38 from the bottom edge of slot 42. At this point, the difference between the level of water in tank 1 and the level of water in float member 38 is sufficient to cause the latter to drop and, through linkage 35 and 27, thereby open control valve 25 against the supply pressure. It is a further feature of my invention that once the valve is cracked partially open, it frees the trapped water therebehind, thereby rapidly reducing the effective supply pressure thereon whereby the valve moves almost instantly to its full open position illustrated in broken lines in Fig. 6, whereupon all of the parts assume the position thereof illustrated in Fig. 3.

With control valve 25 in its open position, supply water passes from inlet 13 into housing 17, to the bottom thereof, and begins to fill housing 17. When the water in housing 17 reaches the upper edge of the tank filling riser tube 44, it begins spilling therethrough out of housing 17 to fill the tank 1.

It is a feature of my invention that riser tube 44 is so designed, relative to control valve 25, that water is permitted to enter housing 17 faster than it can exit therefrom through riser tube 44, with the result that water continues to rise in housing 17 until it causes the floatable vent valve 32 to rise upwardly and close vent opening 30. Valve 32 floats easily on the rising water, with air being trapped in its annular skirt 33, whereby water is trapped in housing 17 and can exit therefrom only through riser tube 44 and through the bowl filling opening 45 in bottom wall 28.

Water continues to spill through these two openings, filling tank 1, until the level of water in tank 1 reaches the upper edge of slot 42 with float member 38 in lowered position, shown as level C (Fig. 3), which is in fact about one-quarter inch above the top of slot 42, whereupon air is again trapped in the upper part of float member 38 and it begins to rise.

It is a feature of my invention that control valve 25 is designed to at all times restrict the flow of water therethrough, even when in open position. For example, I provide approximately a 20% restriction between valve 25 and its seat when the valve is in open position, whereby there is a partial supply pressure urging valve 25 toward closed position. This, together with the weight of the valve, insures that it will follow the rising motion of float member 38, acting in effect to hold stem 27 against the short arm of lever 35, whereby as float member 38 begins to rise the valve 25 moves toward closed position, further restricting the flow of water therethrough.

As valve 25 moves toward closed position and further restricts the flow of water therethrough, the effective supply pressure on valve 25 increases, and beyond a certain point it increases so rapidly that valve 25 closes substantially instantly, float member 38 by that time having become completely buoyant and rising to the position thereof shown in Fig. 2.

When control valve 25 closes, passage of supply water into housing 17 stops, but filling of tank 1 continues until the level of water in housing 17 reaches the upper end of riser tube 44, and the water therein is at the level of water in tank 1.

Thus, by using the supply water pressure to urge the control valve to follow float member 38, and to hold valve 25 in closed position, the control valve does not have to close against the water pressure, as in conventional systems, but instead it is held securely closed by the very pressure which it must control. Further this system provides very rapid valve opening and closing movements, which is considered desirable.

Surge dampener 49 absorbs the back pressure shock in the inlet conduit, caused by such sudden closing of control valve 25, to prevent hammering and insure quiet operation.

Thus, it is seen that the supply valve assembly of my invention provides a very smooth, positive and quiet operation, with the initial flow of water into the tank being into housing 17, which is substantially closed.

It is another feature of my invention that very little supply pressure is needed to fill tank 1, and further that the toilet bowl, not shown, is always filled for sealing purposes when there is sufficient pressure to at all times fill the tank. Thus, as previously noted the upper end of overflow pipe 10 is well below the upper end of riser tube 44. If there is enough pressure to bring water into the housing 17 and up to the upper edge of riser tube 44 to fill the tank, then when the flow of water into housing 17 ceases there is a head of water, from the top edge of riser 44 to the level of the top edge of overflow pipe 10, which will pass through opening 45 and conduit 46 and into overflow pipe 10 to insure filling the toilet bowl. Indeed, so long as water rises above the top of overflow pipe 10, water will flow therethrough to seal the bowl.

It is noted that, when tank 1 first reaches filled condition, the level of water in housing 17 will be at about the level of overflow pipe 10. However, after standing awhile this will gradually drop to level A because of seepage past valve stem 27 and for convenience it is shown thereat in Fig. 2.

Another feature of my invention which is extremely important is its antisiphoning characteristic. In many instances, using a conventional supply valve assembly, it has been found that if the main water supply in the house is shut off water in the toilet tank sometimes will be siphoned back past the supply valve and into the main water line of the house. Often this water is contaminated, and therefore it is possible to thus contaminate the entire water system.

However, this will not occur with the valve assembly of my invention, because the water in tank 1 always stops at a level well below the control valve, with the receding water in housing 17 permitting valve 32 to drop back onto cap 18 and thereby open vent passage 30. Therefore, if the water supply were shut off and control valve 25 should open, it would simply vent the water line to the atmosphere, with no possibility of contaminated water passing therethrough because the control valve is spaced well above the level of water within the tank 1 and is enclosed within housing 17.

In practice, I prefer to make the various housing parts of a plastic material, which I have found is less susceptible than metal to fouling and corrosion, and indeed it is possible that all of the parts could be made of such plastic material. In any event, it is seen that I have provided a supply valve assembly which fully accomplishes the aforesaid objects, requiring no adjusting and having an absolute minimum of mechanically moving parts, and utilizing the hydraulic action of the water to accomplish the desired results.

While only one embodiment of my invention has been described in detail herein, it is to be understood that I do not thereby intend to limit my invention to such details and realize that the same can be modified and varied by those skilled in the art without departing from the scope of my invention as defined in the appended claims.

Having fully disclosed and completely described the toilet tank supply valve assembly of my invention, what I claim as new is as follows:

1. A toilet tank supply valve assembly comprising, in combination with a toilet tank, a normally upright housing, inlet conduit means adapted for connection to a source of water under supply pressure extending into said housing through the lower end thereof to a point adjacent the upper end thereof, means defining a control valve seat across said inlet conduit means at a point spaced above the normal level of water in said tank, a control valve normally held against said seat by the pressure of water in said inlet conduit means and movable away therefrom against such water pressure to admit water from said inlet conduit means into said housing, a hollow float member positioned on said housing for rising and falling movements relative thereto, said float member being partially submerged when said tank is filled, means defining an opening in a side wall of said float member for placing the lower part of said float member in communication with water in said tank, tank filling conduit means extending into said housing and having an inlet positioned therein between said control valve seat and the normal level of water in said tank, bowl filling conduit means extending into said housing and having an inlet positioned therein substantially below the inlet of said tank filling conduit means, and substantially rigid actuating link means interconnecting said control valve and said float member and translating downward movement of the latter into opening movement of the former, whereby when said tank is full the water therein seals off the upper part of said float member causing the latter to become at least partially buoyant, and whereby upon flushing said tank said float member is supported against downward movement by the pressure of water in said inlet conduit means acting against said control valve and through said actuating link means until the level of water in said tank drops below the level of water in said float member a distance establishing a head of water exerting sufficient pressure through said actuating link means to overcome the pressure acting to hold said control valve closed against said valve seat whereupon said float member drops and said control valve opens.

2. A supply valve assembly as set forth in claim 1, wherein said control valve and said seat are designed to at all times restrict the passage of water therethrough, whereby said control valve is always urged toward closed position by the pressure of water in said inlet conduit means.

3. A supply valve assembly as set forth in claim 1, wherein said control valve is movable in a substantially vertical direction, and wherein said actuating means comprises a force multiplying lever pivoted below said control valve and said float member for movement about a substantially horizontal axis, and vertical stem means depending from said control valve, said lever having a relatively short arm normally supporting said stem means and a relatively long arm normally supporting said float member.

4. A toilet tank supply valve assembly comprising, in combination with a toilet tank and overflow conduit means therefor, an elongated normally upright housing in said tank, inlet conduit means adapted for connection to a source of water under pressure and having an outlet opening positioned within said housing substantially above the top of said overflow conduit means, a control valve adapted to close said outlet opening, said control valve opening inwardly against the pressure of water in said inlet conduit means and being urged toward closed position by such water pressure, a float member guided by said housing for rising and falling movements thereon, said float member controlling the opening and closing movements of said control valve, tank filling conduit means extending from the interior of said housing into communication with the interior of said tank exteriorly of said housing, the entrance to said tank filling conduit means being positioned above the top of said overflow conduit means and below said outlet opening, whereby when said control valve opens water passes through said outlet opening into said housing and fills the latter to the level of said entrance of said tank filling conduit means to fill said tank, and bowl filling conduit means extending from the interior of said housing into communication with said overflow conduit means, the entrance to said bowl filling conduit means being substantially at least as far below the entrance to said tank filling conduit means as the top of said overflow conduit means, whereby if there is sufficient water to enter said tank filling conduit means there is sufficient water to fill an associated toilet bowl through said bowl filling conduit means.

5. A toilet tank supply valve assembly as set forth in claim 4, wherein said housing extends through said float member, together with a vent opening through the upper end of said housing placing the interior thereof in communication with the interior of said tank at a point above said outlet opening.

6. A toilet tank supply valve assembly comprising, in combination with a toilet tank having overflow conduit means, a normally upright housing, inlet conduit means adapted for connection to a supply of water, and having an outlet opening into said housing at a point substantially above the top of said overflow conduit means, a control valve for said outlet opening, a float member supported on said housing for rising and falling thereon with said housing extending through said float member, said float member controlling opening and closing movements of said control valve, means venting said housing through the upper end thereof to the interior of said tank at a point above said outlet opening, tank filling conduit means placing the interior of said housing in communication with the interior of said tank exteriorly of said housing and having an entrance positioned between said outlet opening and the top of said overflow conduit means, and bowl filling conduit means opening into said housing and placing the interior of said housing in communication with said overflow conduit means, said bowl filling conduit means having an entrance positioned substantially below the top of said overflow conduit means.

7. A toilet tank supply valve assembly comprising, an elongated normally upright first housing, inlet conduit means extending into said first housing from one end thereof to a point adjacent the opposite end thereof, means defining an inlet chamber in said first housing communicating with said inlet conduit means at the end thereof adjacent said opposite end of said first housing, means defining an outlet opening from said chamber to the interior of said first housing, a control valve for closing said outlet opening on the inlet chamber side thereof and movable inwardly of said inlet chamber to open said outlet opening, valve stem means extending from said control valve through said outlet opening generally lengthwise of said first housing to and through said one end of said first housing, a float member comprising a second housing mounted on and guided by said first housing for movement lengthwise thereof, means defining an opening in a side wall of said second housing, a lever of the first class pivotally supported on said first housing adjacent said one end thereof, one arm of said lever being adapted to abut said stem means while the other arm of said lever abuts said second housing, tank filling riser conduit means extending into said first housing through said one end thereof to a point spaced from said outlet opening toward said one end of said first housing, and bowl filling passage means through said one end of said first housing.

8. A toilet tank supply valve assembly as set forth in claim 7, wherein water can enter said first housing through said outlet opening faster than it can exit therefrom through said tank filling riser conduit means, and wherein said first housing extends through said second housing and said opposite end projects therebeyond, together with means defining a vent opening for said first housing through said opposite end thereof, and a floatable valve loosely confined between said inlet chamber and said opposite end of said first housing for closing said vent opening when said first housing fills with water.

9. A toilet tank supply valve assembly comprising, in combination with a toilet tank and overflow conduit means therefor, a normally upright housing in said tank, inlet conduit means adapted for connection to a source of water under pressure and having an outlet opening positioned within said housing substantially above the entrance to said overflow conduit means, a control valve adapted to close said outlet opening, a float member guided by said housing for rising and falling movements relative thereto, said float member controlling opening and closing movements of said control valve relative to said outlet opening, tank filling conduit means extending from the interior of said housing into communication with the interior of said tank exteriorly of said housing, the entrance to said tank filling conduit means being positioned between said outlet opening and said entrance to said overflow conduit means, whereby when said control valve opens water passes through said outlet opening into said housing and fills the latter to the level of said entrance to said tank filling conduit means to fill said tank, and bowl filling conduit means communicating with the interior of said housing and with said overflow conduit means, the entrance to said bowl filling conduit means being positioned substantially below said entrance to said overflow conduit means, whereby if sufficient water enters said housing to reach the level of said entrance to said tank filling conduit means there is sufficient water in said housing to fill an associated toilet bowl to seal the same through said bowl filling conduit means.

References Cited in the file of this patent

UNITED STATES PATENTS

| | | |
|---|---|---|
| 916,735 | Loeble | Mar. 30, 1909 |
| 1,158,743 | Swanberg | Nov. 2, 1915 |
| 1,270,901 | Watrous | July 2, 1918 |
| 1,926,018 | Armstrong | Sept. 12, 1933 |
| 2,252,078 | Kohlmeyer | Aug. 12, 1941 |
| 2,619,122 | Hunter | Nov. 25, 1952 |
| 2,706,998 | Bletcher et al. | Apr. 26, 1955 |
| 2,809,656 | Goldtrap | Oct. 15, 1957 |

UNITED STATES PATENT OFFICE
CERTIFICATE OF CORRECTION

Patent No. 2,900,996                                          August 25, 1959

Charley L. Goldtrap

It is hereby certified that error appears in the printed specification of the above numbered patent requiring correction and that the said Letters Patent should read as corrected below.

Column 5, lines 4 and 5, for "sufficient pressure to at all times fill the tank" read -- sufficient present to at all fill the tank --.

Signed and sealed this 5th day of April 1960.

(SEAL)
Attest:

KARL H. AXLINE
Attesting Officer

ROBERT C. WATSON
Commissioner of Patents